(12) United States Patent
Liu et al.

(10) Patent No.: US 12,519,771 B2
(45) Date of Patent: Jan. 6, 2026

(54) METHOD AND DEVICE FOR TWO-FACTOR AUTHENTICATION, COMPUTER DEVICE, AND STORAGE MEDIUM

(71) Applicant: INSPUR SUZHOU INTELLIGENT TECHNOLOGY CO., LTD., Suzhou (CN)

(72) Inventors: Yuansong Liu, Suzhou (CN); Xianzhuang Li, Suzhou (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 348 days.

(21) Appl. No.: 18/245,783

(22) PCT Filed: Jul. 30, 2021

(86) PCT No.: PCT/CN2021/109514
§ 371 (c)(1),
(2) Date: Mar. 17, 2023

(87) PCT Pub. No.: WO2022/088808
PCT Pub. Date: May 5, 2022

(65) Prior Publication Data
US 2023/0336541 A1 Oct. 19, 2023

(30) Foreign Application Priority Data
Oct. 28, 2020 (CN) .......................... 202011169861.4

(51) Int. Cl.
*H04L 9/40* (2022.01)
(52) U.S. Cl.
CPC ................................ *H04L 63/0823* (2013.01)
(58) Field of Classification Search
CPC ........... H04L 63/0823; H04L 2463/082; H04L 9/3268
See application file for complete search history.

(56) References Cited

U.S. PATENT DOCUMENTS

| 8,286,227 B1 | 10/2012 | Zheng |
| 2003/0037237 A1* | 2/2003 | Abgrall ................. H04L 63/062 713/166 |

(Continued)

FOREIGN PATENT DOCUMENTS

| CN | 104160653 A | 11/2014 |
| CN | 104486343 A | 4/2015 |

(Continued)

OTHER PUBLICATIONS

Zhang et al., "TrustTokenF: a Generic Security Framework for Mobile Two-factor Authentication Using TrustZone", Aug. 2015, IEEE Trustcom/BigDataSE/ISPA, pp. 41-48 (Year: 2015).*

(Continued)

*Primary Examiner* — Kenneth W Chang
(74) *Attorney, Agent, or Firm* — Dennemeyer & Associates LLC (57) ABSTRACT

A method and device for two-factor authentication, a computer device, and a storage medium are provided. The method includes: acquiring a root certificate and importing the root certificate into a two-factor service, and configuring an Ingress object according to the root certificate; generating a user certificate by using the two-factor service, and issuing the user certificate to a user according to the root certificate; intercepting an access request from a client by using the Ingress object, and performing, according to the root certificate, trustworthiness verification on a user certificate to be authenticated carried in the access request; and in a case where the user certificate to be authenticated carried in the access request is trustworthy, forwarding the access request to the two-factor service for further authentication.

17 Claims, 4 Drawing Sheets

(56) References Cited

U.S. PATENT DOCUMENTS

| | | | | |
|---|---|---|---|---|
| 2005/0144437 A1* | 6/2005 | Ransom | .................... | G06F 1/28 |
| | | | | 700/286 |
| 2008/0010458 A1* | 1/2008 | Holtzman | ........... | H04L 63/0823 |
| | | | | 713/189 |
| 2012/0023568 A1* | 1/2012 | Cha | .................... | H04L 63/0807 |
| | | | | 726/10 |
| 2013/0311771 A1* | 11/2013 | Hoggan | ................ | H04L 9/3268 |
| | | | | 713/156 |
| 2013/0339740 A1* | 12/2013 | Ben-Shalom | ....... | H04L 63/0876 |
| | | | | 713/175 |
| 2017/0141926 A1* | 5/2017 | Xu | ........................ | H04L 9/3066 |

FOREIGN PATENT DOCUMENTS

| | | | |
|---|---|---|---|
| CN | 107241345 A | 10/2017 | |
| CN | 110610075 A | 12/2019 | |
| CN | 111428213 A | 7/2020 | |
| CN | 112468442 A | 3/2021 | |

OTHER PUBLICATIONS

Search report for PCT/CN2021/109514 mailed on Oct. 11, 2021.
Search report for Chinese application 202011169861.4 filed on Oct. 28, 2020.

* cited by examiner

METHOD AND DEVICE FOR TWO-FACTOR AUTHENTICATION, COMPUTER DEVICE, AND STORAGE MEDIUM

CROSS-REFERENCE TO RELATED APPLICATIONS

This is a 35 U.S.C. 371 National Stage Patent Application of International Application No. PCT/CN2021/109514, filed Jul. 30, 2021, which claims priority to Chinese application 202011169861.4, filed Oct. 28, 2020, each of which is hereby incorporated by reference in its entirety.

The present disclosure claims the priority of Chinese Patent Application No. 202011169861.4, filed with China National Intellectual Property Administration on Oct. 28, 2020 and entitled "Method and Device for Two-Factor Authentication, Computer Device, and Storage Medium", which is incorporated herein by reference in its entirety.

TECHNICAL FIELD

The present disclosure relates to the field of data security, and in particular, to a method and device for two-factor authentication, a computer device, and a storage medium.

BACKGROUND

Two-factor authentication (2FA), also known as two-step authentication or dual-factor authentication, is a security authentication process. In a process for two-factor authentication, a user is required to provide two different authentication factors to prove his/her identity, so as to better protect user certificates and resources accessible to the user. Two-factor authentication provides a higher level of assurance than a single factor authentication approach. In the single-factor authentication, the user only needs to provide one authentication factor, for example, password or passphrase, to complete the process. The two-factor authentication approach not only requires the user to provide a password, but also needs a second factor, typically a security token or a biometric factor like fingerprint and face scan.

A Secure Socket Layer (SSL) certificate is an encryption technology for establishing an encrypted link between a Web server and a browser/client. By configuring and applying the SSL certificate, a Hyper Text Transfer Protocol over Secure Socket Layer (HTTPS) is enabled, so as to ensure the security of data transmission in the Internet. The HTTPS protocol supports one-way authentication and two-way authentication. In a one-way authentication process, a client downloads, from a server, a public key certificate of the server for authentication, and then establishes a secure communication channel. In a two-way communication process, in addition to downloading, from the server, a public key certificate of the server for authentication, a client also needs to upload a public key certificate of the client to the server for authentication by the server, and only when the authentication is passed at both sides, a secure communication channel is started to be established for data transmission. Compared to one-way authentication, two-way authentication can provide higher level of security.

At present, a two-factor authentication can be performed by using a user certificate and an account password, and a separate two-factor authentication function may be provided at the back end, and a client may initiate an authentication request carrying the certificate to a two-factor service at the back end. However, when many users simultaneously initiate authentication requests or use error certificates to attack the two-factor service maliciously, the number of authentication requests is likely to increase suddenly in a certain period of time, thereby causing service crashing. Although technologies such as a request queue may be used to temporarily store the authentication requests to implement "peak clipping" and relieve transient pressure on the two-factor service, numerous authentication requests carrying invalid certificates finally reach the two-factor service at the back end, thereby causing a waste of resources.

SUMMARY

In view of this, in order to solve the technical problem above, it is necessary to provide a method and device for two-factor authentication, a computer device, and a storage medium, which may avoid invalid access requests and prevent malicious attacks to a two-factor service.

According to a first aspect of the embodiments of the present disclosure, a method for two-factor authentication is provided. The method includes:
  acquiring a root certificate and importing the root certificate into a two-factor service, and configuring an Ingress object (for example, an Application Program Interface (API) object managing external access to a service in a cluster) according to the root certificate;
  generating a user certificate by using the two-factor service, and issuing the user certificate to a user according to the root certificate;
  intercepting an access request from a client by using the Ingress object, and performing, according to the root certificate, trustworthiness verification on a user certificate to be authenticated carried in the access request; and
  in a case where the user certificate to be authenticated carried in the access request is trustworthy, forwarding the access request to the two-factor service for further authentication.

In one of the embodiments, the method further includes:
  in a case where the user certificate to be authenticated carried in the access request is untrustworthy, returning, by the Ingress object, a rejection to the client to reject the access request from the client, and determining that the user certificate to be authenticated carried in the access request is a malicious certificate.

In one of the embodiments, acquiring the root certificate and importing the root certificate into the two-factor service, and configuring the Ingress object according to the root certificate includes:
  generating a Certification Authority (CA) certificate via an administrator end, and importing the CA certificate into the two-factor service as the root certificate; and
  creating and configuring the Ingress object based on the CA certificate.

In one of the embodiments, generating the user certificate by using the two-factor service, and issuing the user certificate to the user according to the root certificate includes:
  acquiring user information, and generating the user certificate by using the two-factor service according to the user information;
  issuing the user certificate to the user based on the root certificate; and
  establishing an association between the user certificate and the corresponding user information, and storing the association in a database.

In one of the embodiments, performing, according to the root certificate, the trustworthiness verification on the user certificate to be authenticated carried in the access request includes:

acquiring a CA certificate corresponding to the user certificate to be authenticated and matching the acquired CA certificate with CA certificates in the Ingress object;

in a case where the CA certificate corresponding to the user certificate to be authenticated is found from the CA certificates in the Ingress object, determining that the user certificate to be authenticated carried in the access request is trustworthy; and in a case where the CA certificate corresponding to the user certificate to be authenticated is not found from the CA certificates in the Ingress object, determining that the user certificate to be authenticated carried in the access request is untrustworthy.

In one of the embodiments, in the case where the user certificate to be authenticated carried in the access request is trustworthy, forwarding the access request to the two-factor service for authentication includes:

the two-factor service authenticating whether an account password carried in the access request is correct;

in a case where the account password carried in the access request is correct, authenticating, by the two-factor service, whether content of the user certificate to be authenticated is correct; and in a case where the content of the user certificate to be authenticated is correct, returning a successful login of the user.

In one of the embodiments, authenticating, by the two-factor service, whether the content of the user certificate to be authenticated is correct includes:

parsing, by the two-factor service, the content of the user certificate to be authenticated to obtain user information and a user feature value;

querying a database for a preset user feature value according to the user information; and in a case where the user feature value matches the preset user feature value, determining that the content of the user certificate to be authenticated is correct.

According to a second aspect of the embodiments of the present disclosure, a device for two-factor authentication is provided. The device includes:

a root certificate acquisition module, configured to acquire a root certificate and import the root certificate into a two-factor service, and configure an Ingress object according to the root certificate;

a user certificate issuing module, configured to generate a user certificate by using the two-factor service, and issue the user certificate to a user according to the root certificate;

a request intercepting module, configured to intercept an access request from a client by using the Ingress object, and perform, according to the root certificate, trustworthiness verification on a user certificate to be authenticated carried in the access request; and an authentication module, configured to forward the access request to the two-factor service for further authentication in a case where the user certificate to be authenticated carried in the access request is trustworthy.

According to a third aspect of the embodiments of the present disclosure, a computer device is further provided. The computer device includes:

at least one processor; and a memory, wherein the memory stores a computer program capable of running on the at least one processor, and when the at least one processor executes the program, the described method for two-factor authentication is executed.

According to a fourth aspect of the embodiments of the present disclosure, a computer-readable storage medium is further provided. The computer-readable storage medium stores a computer program, and when the computer program is executed by a processor, the described method for two-factor authentication is executed.

According to the described method for two-factor authentication, a root certificate is first imported into a two-factor service and issued to a user, and an Ingress object is configured according to the root certificate; then an access request from a client is intercepted by using the Ingress object, and thus trustworthiness verification on a user certificate to be authenticated carried in the access request is performed according to the root certificate, and after it is determined that the user certificate to be authenticated is trustworthy, subsequent authentication is performed by the two-factor service. In this way, the trustworthiness of a user certificate to be authenticated is verified at a front-end location, so that invalid access requests are effectively intercepted before the invalid access requests reach a two-factor service at the back end, thereby greatly improving the availability of the two-factor service at the back end, and preventing the two-factor service at the back end from crashing due to a malicious attack.

In addition, the embodiments of the present disclosure further provide a device for two-factor authentication, a computer device, and a computer-readable storage medium, which may also achieve the described technical effects, and details are not described herein again.

BRIEF DESCRIPTION OF THE DRAWINGS

To describe the technical solutions in the embodiments of the present disclosure or in the related art more clearly, the following briefly introduces the drawings required for describing the embodiments or the related art. Apparently, the drawings in the following description show merely some embodiments of the present disclosure, and a person having ordinary skill in the art may still derive other embodiments from these drawings without inventive efforts.

DETAILED DESCRIPTION

To make the objectives, technical solutions, and advantages of the present disclosure clearer, the following further describes the embodiments of the present disclosure in detail with reference to the drawings and exemplary embodiments.

It should be noted that, in the embodiments of the present disclosure, all expressions using "first" and "second" are used to distinguish two different entities or different parameters having the same name. Therefore, the terms "first" and "second" are only for convenience of description, and should not be understood as limitations to the embodiments of the present disclosure, and it will not be described one by one in subsequent embodiments.

Figure 1:
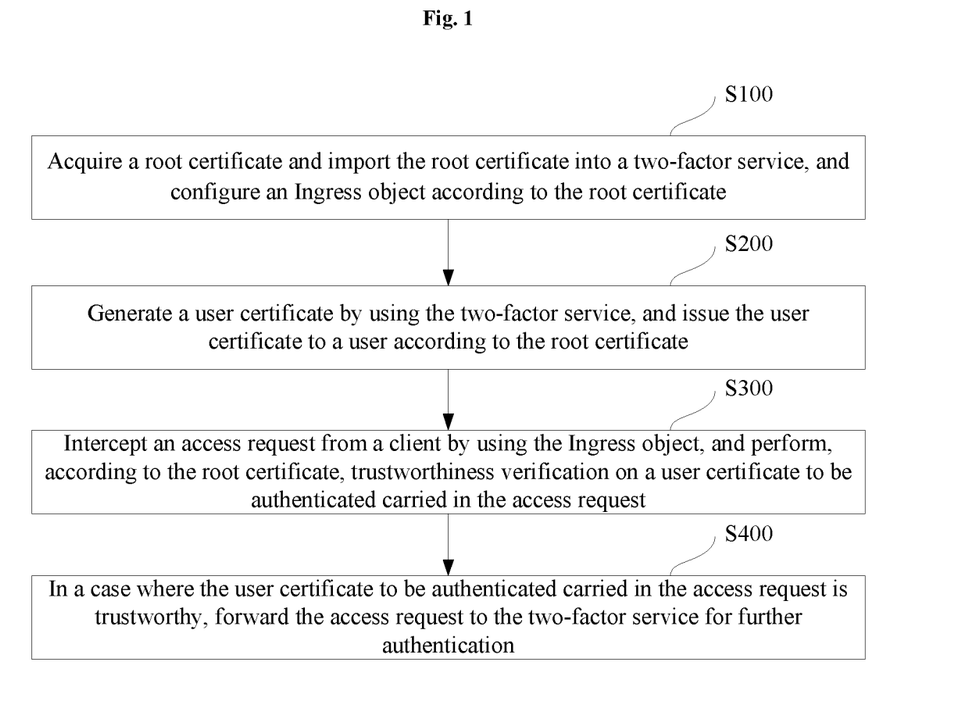
FIG. 1 is a schematic flowchart of a method for two-factor authentication according to an embodiment of the present disclosure.

In an embodiment, as shown in FIG. 1, a method for two-factor authentication is provided. The method includes the following operations S100 to S400.

At S100, a root certificate is acquired and the root certificate is imported into a two-factor service, and an Ingress object is configured according to the root certificate.

The Ingress object is a Application Programming Interface (API) object managing external access to a service (usually HTTP) in a cluster, and the Ingress object may provide load balancing, SSL terminal, and name-based virtual host.

At S200, a user certificate is generated by using the two-factor service, and the user certificate is issued to a user according to the root certificate.

At S300, an access request from a client is intercepted by using the Ingress object, and trustworthiness verification on a user certificate to be authenticated carried in the access request is performed according to the root certificate.

At S400, in a case where the user certificate to be authenticated carried in the access request is trustworthy, the access request is forwarded to the two-factor service for further authentication.

According to the described method for two-factor authentication, a root certificate is first imported into a two-factor service and issued to a user, and an Ingress object is configured according to the root certificate; then an access request from a client is intercepted by using the Ingress object, and thus trustworthiness verification on a user certificate to be authenticated carried in the access request is performed according to the root certificate, and after it is determined that the user certificate to be authenticated is trustworthy, subsequent authentication is performed by the two-factor service. In this way, the trustworthiness of a user certificate to be authenticated is verified at a front-end location, so that invalid access requests are effectively intercepted before the invalid access requests reach a two-factor service at the back end, thereby greatly improving the availability of the two-factor service at the back end, and preventing the two-factor service at the back end from crashing due to a malicious attack.

In an exemplary embodiment, the method further includes S500.

At S500, in a case where the user certificate to be authenticated carried in the access request is untrustworthy, the Ingress object returns a rejection to the client to reject the access request from the client, and determines that the user certificate to be authenticated carried in the access request is a malicious certificate.

Figure 2:
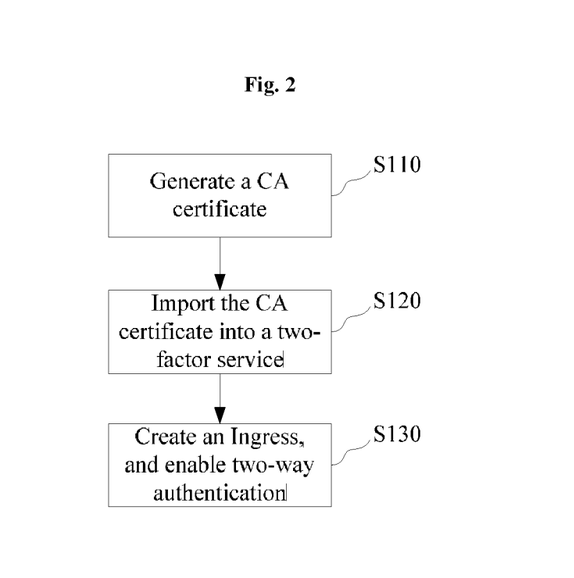
FIG. 2 is a schematic diagram of sub-processes of operation S100 according to another embodiment of the present disclosure.

In still another embodiment, as shown in FIG. 2, S100 includes the following sub-operations S110 to S130.

At S110, a CA certificate is generated via an administrator end.

At S120, the CA certificate is imported into the two-factor service as the root certificate.

At S130, the Ingress object is created and configured based on the CA certificate.

In still another embodiment, S200 includes the following sub-operations S210 to S230.

At S210, user information is acquired, and the user certificate is generated by using the two-factor service according to the user information.

At S220, the user certificate is issued to the user based on the root certificate.

At S230, an association between the user certificate and the corresponding user information is established, and the association is stored in a database.

In still another embodiment, the implementation process of performing, according to the root certificate, trustworthiness verification on the user certificate to be authenticated carried in the access request in S300 includes the following sub-operations S310 to S330.

At S310, a CA certificate corresponding to the user certificate to be authenticated is acquired and the acquired CA certificate is matched with CA certificates in the Ingress object.

At S320, in a case where the CA certificate corresponding to the user certificate to be authenticated is found from the CA certificates in the Ingress object, it is determined that the user certificate to be authenticated carried in the access request is trustworthy.

At S330, in a case where the CA certificate corresponding to the user certificate to be authenticated is not found from the CA certificates in the Ingress object, it is determined that the user certificate to be authenticated carried in the access request is untrustworthy.

In still another embodiment, S400 includes the following sub-operations S410 to S430.

At S410, the two-factor service authenticates whether an account password carried in the access request is correct.

At S420, in a case where the account password carried in the access request is correct, the two-factor service authenticates whether content of the user certificate to be authenticated is correct.

At S430, in a case where the content of the user certificate to be authenticated is correct, a successful login of the user is returned.

In an exemplary embodiment, authenticating, by the two-factor service, whether the content of the user certificate to be authenticated is correct in S420 includes the following sub-operations S421 to S423.

At S421, the two-factor service parses the content of the user certificate to be authenticated to obtain user information and a user feature value.

At S422, a database is queried for a preset user feature value according to the user information.

At S423, in a case where the user feature value matches the preset user feature value, it is determined that the content of the user certificate to be authenticated is correct.

Figure 3:
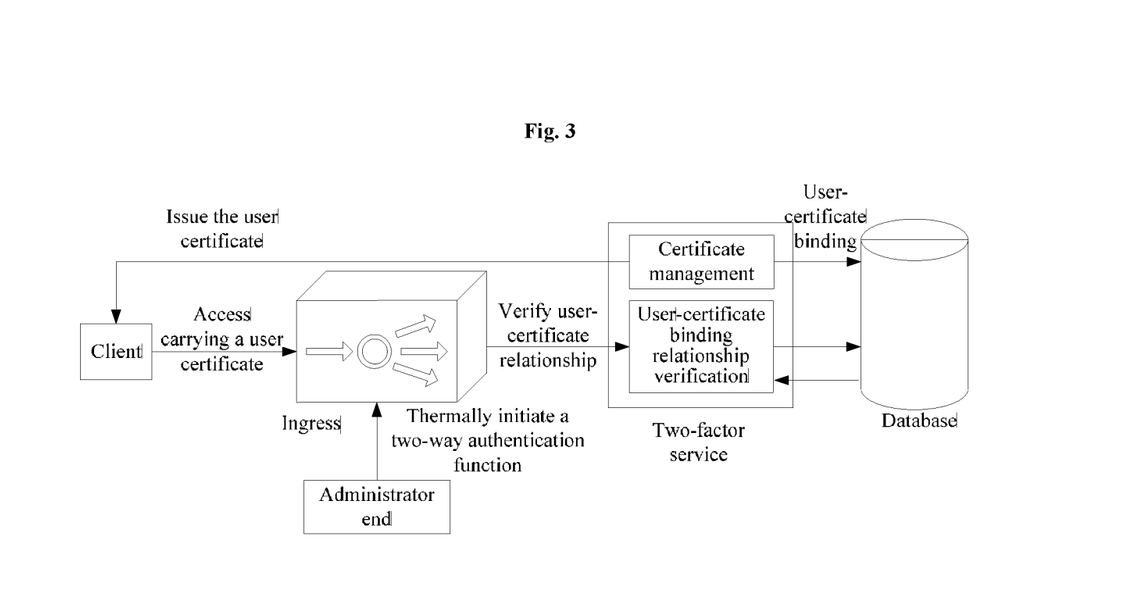
FIG. 3 is a schematic diagram of a process for two-factor authentication according to another embodiment of the present disclosure.

In another embodiment, with reference to FIG. 3, FIG. 3 shows a schematic diagram of a process for two-factor authentication. To facilitate understanding of the technical solution of the embodiments of the present disclosure, a method for two-factor authentication is provided. The following describes a process of requesting, via a client, to access a database by a Kubernetes of a multi-host architecture (Kubernetes is open-source and used for managing containerized applications on a plurality of hosts in a cloud platform, and an objective of Kubernetes is to make deployment of containerized applications simple and efficient).

In operation 1, a system administrator generates a CA certificate at an administrator end, and imports the CA certificate into a two-factor service as a root certificate for issuing a user certificate, wherein the two-factor service includes a certificate management unit and a user-certificate binding relationship verification unit.

In operation 2, based on the CA certificate generated in operation 1, an Ingress is created and set as two-way authentication enabled. In an exemplary embodiment, the system administrator may configure, on an interface, whether to enable a two-factor service according to actual needs, for example, the enabling of the two-factor service may be realized by modifying an Ingress configuration parameter of the Kubernetes in real time.

In operation 3, the certificate management unit of the two-factor service generates a certificate and issues the certificate to a user, and at the same time, establishes an association between the user certificate and the corresponding user information and stores the association in a database.

In operation 4, a client sends a request carrying a user certificate to the Ingress, and the Ingress performs trustworthiness verification on the user certificate and forwards the request to a two-factor service at the back end. Besides carrying the user certificate, the access request from the client further includes a CA certificate corresponding to the user certificate, an account password, etc.

In operation 5, the Ingress verifies the trustworthiness of the user certificate, and in a case where the verification is not passed, the Ingress directly returns a rejection to the access request from the client or an error, otherwise, the Ingress forwards the request to the two-factor service.

In operation 6, in a case where the two-factor service receives the access request forwarded by the Ingress, the two-factor service parses the content of the user certificate to be authenticated carried in the access request, the user-certificate binding relationship verification unit matches user certificate information with a user feature value in the database, and in a case where the matching succeeds, the user login is successful; otherwise, the user login fails.

The described method for two-factor authentication realizes a configurable two-factor authentication system based on an Ingress in a multi-host architecture. The system can effectively intercept a malicious certificate at the Ingress by performing certificate trustworthiness verification at the front end, thereby preventing numerous invalid certificate requests from directly accessing a certificate verification service at the back end, ensuring the stable running of the certificate verification service at the back end, and greatly enhancing the availability of the two-factor service. In addition, by utilizing the characteristic that the Ingress can be initiated thermally, real-time enabling and disabling of a two-factor authentication function can be realized.

Figure 4:
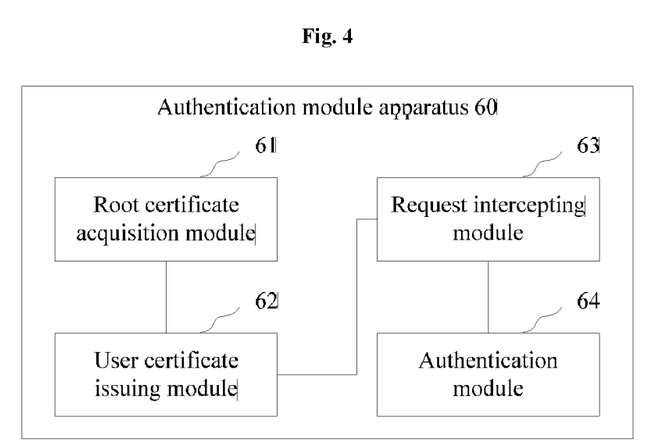
FIG. 4 is a schematic structural diagram of a device for two-factor authentication according to another embodiment of the present disclosure.

In still another embodiment, with reference to FIG. 4, which shows a schematic structural diagram of a device for two-factor authentication, a device for two-factor authentication 60 is provided. The device includes:
- a root certificate acquisition module 61, configured to acquire a root certificate and import the root certificate into a two-factor service, and configure an Ingress object according to the root certificate;
- a user certificate issuing module 62, configured to generate a user certificate by using the two-factor service, and issue the user certificate to a user according to the root certificate;
- a request intercepting module 63, configured to intercept an access request from a client by using the Ingress object, and perform, according to the root certificate, trustworthiness verification on a user certificate to be authenticated carried in the access request; and
- an authentication module 64, configured to forward the access request to the two-factor service for further authentication in a case where the user certificate to be authenticated carried in the access request is trustworthy.

Figure 5:
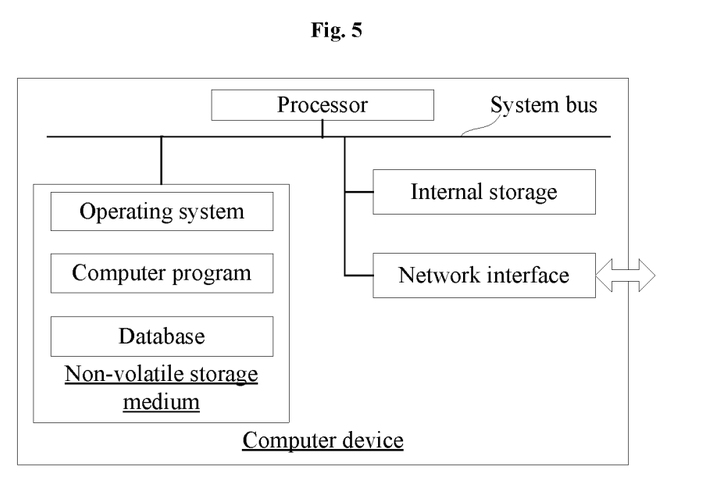
FIG. 5 is an internal structural diagram of a computer device according to another embodiment of the present disclosure.

According to another aspect of the embodiments of the present disclosure, a computer device is provided. The computer device may be a server. For an internal structure of the computer device, reference can be made to FIG. 5. The computer device includes at least one processor, a memory, a network interface, and a database which are connected by a system bus. The at least one processor of the computer device is configured to provide computing and control capabilities. The memory of the computer device includes a non-volatile storage medium and an internal storage. The non-volatile storage medium stores an operating system, a computer program, and a database. The internal storage provides an environment for running of the operating system and the computer program in the non-volatile storage medium. The database of the computer device is configured to store data. The network interface of the computer device is configured to communicate with an external terminal via a network connection. When the computer program is executed by the at least one processor, the described method for two-factor authentication is implemented.

Figure 6:
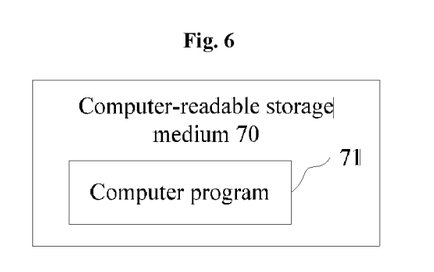
FIG. 6 is a schematic diagram of a computer-readable storage medium according to another embodiment of the present disclosure.

According to still another aspect of the embodiments of the present disclosure, a computer-readable storage medium is provided. As shown in FIG. 6, a computer-readable storage medium 70 provided by the embodiments of the present disclosure stores a computer program 71, and when the computer program 71 is executed by a processor, the described method for two-factor authentication is implemented.

Persons having ordinary skill in the art may understand that all or some of the processes of the method in the foregoing embodiments may be implemented by a computer program instructing relevant hardware. The computer program may be stored in a non-volatile computer-readable storage medium. When the computer program is executed, the processes of the method in the foregoing embodiments may be included. Any references to memory, storage, database, or other media used in the embodiments provided herein may include non-volatile and/or volatile memory. The non-volatile memory may include read-only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, RAM is available in a variety of forms, such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), etc.

Various technical features of the described embodiments may be combined in any way, and for brevity of description, not all possible combinations of the technical features in the described embodiments are described. However, as long as combinations of these technical features are not contradictory, all should be considered to belong to the scope of disclosure of the present description.

The described embodiments merely represent several implementations of the present disclosure, and are described in a specific and detailed manner, but are not intended to limit the scope of the patent of the present disclosure. It should be noted that, for those skilled in the art, various modifications and improvements can be made without departing from the concept of the present disclosure, and all these modifications and improvements belong to the scope of protection of the present disclosure. Therefore, the scope of protection of the present disclosure should be subject to the appended claims.

What is claimed is:

1. A method for two-factor authentication, comprising:
   acquiring a root certificate and importing the root certificate into a two-factor service, and configuring an Ingress object according to the root certificate;
   generating a user certificate by using the two-factor service, and issuing the user certificate to a user according to the root certificate;
   intercepting an access request from a client by using the Ingress object, and performing, according to the root certificate, trustworthiness verification on a user certificate to be authenticated carried in the access request; and
   in a case where the user certificate to be authenticated carried in the access request is trustworthy, forwarding the access request to the two-factor service for further authentication;
   wherein the method further comprises: in a case where the user certificate to be authenticated carried in the access request is untrustworthy, returning by the Ingress object, a rejection to the client to reject the access request from the client and determining that the user certificate to be authenticated carried in the access request is a malicious certificate.

2. The method according to claim 1, wherein acquiring the root certificate and importing the root certificate into the two-factor service, and configuring the Ingress object according to the root certificate comprises:
   generating a Certificate Authority (CA) certificate via an administrator end, and importing the CA certificate into the two-factor service as the root certificate; and
   creating and configuring the Ingress object based on the CA certificate.

3. The method according to claim 2, wherein generating the user certificate by using the two-factor service, and issuing the user certificate to the user according to the root certificate comprises:
   acquiring user information, and generating the user certificate by using the two-factor service according to the user information;
   issuing the user certificate to the user based on the root certificate; and
   establishing an association between the user certificate and the corresponding user information, and storing the association in a database.

4. The method according to claim 3, wherein performing, according to the root certificate, the trustworthiness verification on the user certificate to be authenticated carried in the access request comprises:
   acquiring a CA certificate corresponding to the user certificate to be authenticated and matching the acquired CA certificate with CA certificates in the Ingress object;
   in a case where the CA certificate corresponding to the user certificate to be authenticated is found from the CA certificates in the Ingress object, determining that the user certificate to be authenticated carried in the access request is trustworthy; and
   in a case where the CA certificate corresponding to the user certificate to be authenticated is not found from the CA certificates in the Ingress object, determining that the user certificate to be authenticated carried in the access request is untrustworthy.

5. The method according to claim 1, wherein in the case where the user certificate to be authenticated carried in the access request is trustworthy, forwarding the access request to the two-factor service for authentication comprises:
   authenticating, by the two-factor service, whether an account password carried in the access request is correct;
   in a case where the account password carried in the access request is correct, authenticating, by the two-factor service, whether content of the user certificate to be authenticated is correct; and
   in a case where the content of the user certificate to be authenticated is correct, returning a successful login of the user.

6. The method according to claim 5, wherein authenticating, by the two-factor service, whether the content of the user certificate to be authenticated is correct comprises:
   parsing, by the two-factor service, the content of the user certificate to be authenticated to obtain user information and a user feature value;
   querying a database for a preset user feature value according to the user information; and
   in a case where the user feature value matches the preset user feature value, determining that the content of the user certificate to be authenticated is correct.

7. The method according to claim 1, wherein the Ingress object is an Application Program Interface (API) object managing external access to a service in a cluster.

8. The method according to claim 1, wherein after configuring the Ingress object according to the root certificate, the method further comprises:
   setting the Ingress object as two-way authentication enabled by modifying an Ingress configuration parameter of the Ingress object in real time.

9. A computer device, comprising:
   at least one processor; and
   a memory, wherein the memory stores a computer program capable of running on the at least one processor, and the at least one processor is configured to execute following operations when running the program:
   acquiring a root certificate and importing the root certificate into a two-factor service, and configuring an Ingress object according to the root certificate;
   generating a user certificate by using the two-factor service, and issuing the user certificate to a user according to the root certificate;
   intercepting an access request from a client by using the Ingress object, and performing, according to the root certificate, trustworthiness verification on a user certificate to be authenticated carried in the access request; and
   in a case where the user certificate to be authenticated carried in the access request is trustworthy, forwarding the access request to the two-factor service for further authentication;
   wherein
   the at least on processor is further configured to execute following operations when running the program;
   in a case where the user certificate to be authenticated carried in the access request is untrustworthy, returning, by the Ingress object, a reflection to the client to reject the access request from the client, and determining that the user certificate to be authenticated carried in the access request is a malicious certificate.

10. The computer device according to claim 9, wherein the at least one processor is configured to execute following operations when acquiring the root certificate and importing the root certificate into the two-factor service, and configuring the Ingress object according to the root certificate:
   generating a Certificate Authority (CA) certificate via an administrator end, and importing the CA certificate into the two-factor service as the root certificate; and
   creating and configuring the Ingress object based on the CA certificate.

11. The computer device according to claim 10, wherein the at least one processor is configured to execute following operations when generating the user certificate by using the two-factor service, and issuing the user certificate to the user according to the root certificate:
   acquiring user information, and generating the user certificate by using the two-factor service according to the user information;
   issuing the user certificate to the user based on the root certificate; and
   establishing an association between the user certificate and the corresponding user information, and storing the association in a database.

12. The computer device according to claim 11, wherein the at least one processor is configured to execute following operations when performing, according to the root certificate, the trustworthiness verification on the user certificate to be authenticated carried in the access request:
   acquiring a CA certificate corresponding to the user certificate to be authenticated and matching the acquired CA certificate with CA certificates in the Ingress object;
   in a case where the CA certificate corresponding to the user certificate to be authenticated is found from the CA certificates in the Ingress object, determining that the user certificate to be authenticated carried in the access request is trustworthy; and
   in a case where the CA certificate corresponding to the user certificate to be authenticated is not found from the CA certificates in the Ingress object, determining that the user certificate to be authenticated carried in the access request is untrustworthy.

13. The computer device according to claim 9, wherein the at least one processor is configured to execute following operations when forwarding the access request to the two-factor service for authentication in the case where the user certificate to be authenticated carried in the access request is trustworthy:
   authenticating, by the two-factor service, whether an account password carried in the access request is correct;
   in a case where the account password carried in the access request is correct, authenticating, by the two-factor service, whether content of the user certificate to be authenticated is correct; and
   in a case where the content of the user certificate to be authenticated is correct, returning a successful login of the user.

14. The computer device according to claim 13, wherein the at least one processor is configured to execute following operations when authenticating, by the two-factor service, whether the content of the user certificate to be authenticated is correct:
   parsing, by the two-factor service, the content of the user certificate to be authenticated to obtain user information and a user feature value;
   querying a database for a preset user feature value according to the user information; and
   in a case where the user feature value matches the preset user feature value, determining that the content of the user certificate to be authenticated is correct.

15. The computer device according to claim 9, wherein the Ingress object is an Application Program Interface (API) object managing external access to a service in a cluster.

16. The computer device according to claim 9, wherein the at least one processor is further configured to execute following operations after configuring the Ingress object according to the root certificate when running the program:
   setting the Ingress object as two-way authentication enabled by modifying an Ingress configuration parameter of the Ingress object in real time.

17. A non-transitory computer-readable storage medium, wherein the computer-readable storage medium stores a computer program, and the computer program, when being executed by a processor, causes the processor to execute following operations:
   acquiring a root certificate and importing the root certificate into a two-factor service, and configuring an Ingress object according to the root certificate;
   generating a user certificate by using the two-factor service, and issuing the user certificate to a user according to the root certificate;
   intercepting an access request from a client by using the Ingress object, and performing, according to the root certificate, trustworthiness verification on a user certificate to be authenticated carried in the access request; and
   in a case where the user certificate to be authenticated carried in the access request is trustworthy, forwarding the access request to the two-factor service for further authentication,
   wherein the computer program, when being executed by a processor, further causes the processor to execute following operations: in a case where the user certificate to be authenticated carried in the access request is untrustworthy, returning, by the Ingress object, a rejection to the client to reject the request from the client, and determining that the user certificate to be authenticated carried in the access request is a malicious certificate.

* * * * *